(12) United States Patent
Yang

(10) Patent No.: US 10,884,406 B2
(45) Date of Patent: Jan. 5, 2021

(54) METHOD AND DEVICE FOR CONTROLLING MOVEMENT OF EXTERNAL DEVICE

(71) Applicant: X-CONTROL SYSTEM CO., LTD., Beijing (CN)

(72) Inventor: Fan Yang, Beijing (CN)

(73) Assignee: X-CONTROL SYSTEM CO., LTD., Beijing (CN)

(*) Notice: Subject to any disclaimer, the term of this patent is extended or adjusted under 35 U.S.C. 154(b) by 396 days.

(21) Appl. No.: 15/749,769

(22) PCT Filed: Aug. 3, 2015

(86) PCT No.: PCT/CN2015/085930
§ 371 (c)(1),
(2) Date: Feb. 1, 2018

(87) PCT Pub. No.: WO2017/020222
PCT Pub. Date: Feb. 9, 2017

(65) Prior Publication Data
US 2020/0089218 A1    Mar. 19, 2020

(51) Int. Cl.
*G05D 1/00* (2006.01)
*G05D 1/02* (2020.01)
*B64C 39/02* (2006.01)
*G05D 1/10* (2006.01)

(52) U.S. Cl.
CPC .............. *G05D 1/0016* (2013.01); *G05D 1/02* (2013.01); *B64C 39/024* (2013.01); *G05D 1/101* (2013.01)

(58) Field of Classification Search
CPC ........ G05D 1/0016; G05D 1/02; G05D 1/101; B64C 39/024
See application file for complete search history.

(56) References Cited

U.S. PATENT DOCUMENTS

| 7,231,294 B2 * | 6/2007 | Bodin .................... G01C 21/20 343/705 |
| 7,286,913 B2 * | 10/2007 | Bodin .................. G05D 1/0044 382/106 |
| 9,102,062 B2 | 8/2015 | Lee et al. |
| 9,661,827 B1 * | 5/2017 | Shen .................... A01K 15/027 |

(Continued)

FOREIGN PATENT DOCUMENTS

| CN | 102087530 A | 6/2011 |
| CN | 102890507 A | 1/2013 |

(Continued)

OTHER PUBLICATIONS

PCT International Search Report, PCT/CN2015/085930, dated Apr. 27, 2016, 14 Pages.

(Continued)

*Primary Examiner* — Michael J Zanelli
(74) *Attorney, Agent, or Firm* — Fenwick & West LLP

(57) ABSTRACT

A method and device for controlling movement of an external device. The method (200) comprises: generating an array pattern on an interface of a device (202); and generating a predetermined trace on the array pattern, so that the external device moves according to the predetermined trace (204). By generating a predetermined trace by using an array pattern, the movement of an external device can be controlled rapidly and efficiently.

18 Claims, 3 Drawing Sheets

(56) References Cited

U.S. PATENT DOCUMENTS

| | | | |
|---|---|---|---|
| 2011/0035087 A1 | 2/2011 | Kim et al. |
| 2011/0137550 A1 | 6/2011 | Choi |
| 2013/0024025 A1 | 1/2013 | Hsu |
| 2013/0158748 A1 | 6/2013 | Baillie |
| 2014/0121833 A1 | 5/2014 | Lee et al. |
| 2015/0285644 A1 | 10/2015 | Pfaff et al. |

FOREIGN PATENT DOCUMENTS

| | | |
|---|---|---|
| CN | 2031117786 U | 8/2013 |
| CN | 103329057 A | 9/2013 |
| CN | 103791912 A | 5/2014 |
| CN | 104133472 A | 11/2014 |
| CN | 104677369 A | 6/2015 |
| CN | 104677376 A | 6/2015 |
| JP | 2007-155633 A | 6/2007 |
| WO | WO 2014/151084 A1 | 9/2014 |

OTHER PUBLICATIONS

China National Intellectual Property Administration, First Office Action, CN Patent Application No. 201610548121.9, dated May 29, 2020, 16 pages.

Thrun, S., "Learning metric-topological maps for indoor mobile robot navigation," Artificial Intelligence, vol. 99, Iss. 1, Feb. 1998, pp. 21-71.

Xinde, L. et al., "A Visual Navigation Method Using a Hand-Drawn-Route-Map in Dynamic Environments," Robot, vol. 33, No. 4, Jul. 2011, pp. 490-501 (with English abstract).

\* cited by examiner

METHOD AND DEVICE FOR CONTROLLING MOVEMENT OF EXTERNAL DEVICE

FIELD

Embodiments of the present disclosure generally relate to the technical field of information technology, and more specifically, to a method and device for controlling a movement of an external device.

BACKGROUND

Control operations of a smart mobile device (such as an unmanned aerial vehicle or drone, or a robot) are usually implemented by use of the wireless remote control, for example, an operator sends a control command to the smart mobile device via a controller (such as a remote controller, a hand-held control terminal or a ground console). Conventional control methods generally have two types. One type is dynamic control, the controller sends a dynamic control command to the smart mobile device, for example, a movement direction, a movement speed, a flying height of the smart mobile device is controlled dynamically via the controller. Another type is parameter control, the controller sends a desired target position to the smart mobile device, for example, a desired longitude and latitude coordinates, height coordinates and so on are sent to the smart mobile device, and then the smart mobile device moves according to the received coordinate information.

In addition, it already arises that the movement of the smart mobile device is controlled by a movement of a communication device (such as a smart phone or a tablet computer). For example, as shown in FIG. 1, an operator draws any curve on an electronic map interface of the smart phone. The smart phone fits the curve into one or more line segments, and sends endpoints of the line segments to the unmanned aerial vehicle as movement position points so that the unmanned aerial vehicle moves according a trace of the curve. However, directly drawing the trace on the map causes many corner points, and excessive position points are generated after the fitting, and it will reduce a transmission efficiency of the control command and a movement efficiency of the smart mobile device. At the same time, the line segments in the trace of FIG. 1 are of different lengths, and it is very difficult to determine a movement mode of the trace according to point-and-point relative relationship. In addition, the movement of the smart mobile device generally does not need a complicated trace. For example, during patrol of the unmanned aerial vehicle, a rectangular or triangular trace can cover most application scenarios, so the existing control method is too complicated and has a lower efficiency.

Therefore, in the case that too many and complicated operations are not needed, how to quickly and efficiently control the movement of the smart mobile device is a problem urgently to be solved.

SUMMARY

In view of the above, embodiments of the present disclosure provide a method and device for controlling a movement of an external device, which can quickly and efficiently control the movement of the external device.

According to an aspect of the present disclosure, there is disclosed a method for controlling a movement of an external device. The method comprises generating an array pattern on an interface of a device and generating a predetermined trace on the array pattern so that the external device moves according to the predetermined trace.

According to an embodiment of the present disclosure, wherein the generated array pattern comprises any of a rectangular array and an annular array.

According to another embodiment of the present disclosure, wherein the rectangular array is an array with three rows and three columns.

According to a further embodiment of the present disclosure, wherein the generating the array pattern on the interface of the device comprises generating a corresponding array pattern on the interface of the device according to a predetermined setting.

According to an embodiment of the present disclosure, wherein the generating the array pattern on the interface of the device comprises generating the array pattern on an electronic map of the device.

According to another embodiment of the present disclosure, wherein the generating a predetermined trace on the array pattern comprises moving and/or scaling the electronic map and/or array pattern to generate the predetermined trace on the array pattern.

According to a further embodiment of the present disclosure, wherein the moving and/or scaling the electronic map and/or array pattern to generate the predetermined trace on the array pattern comprises moving and/or scaling the electronic map and/or array pattern according to the predetermined trace so that the predetermined trace is completely included in the array pattern.

According to an embodiment of the present disclosure, wherein the generating a predetermined trace on the array pattern comprises: rotating the electronic map and/or array pattern to generate the predetermined trace on the array pattern.

According to another embodiment of the present disclosure, wherein the rotating the electronic map and/or array pattern to generate the predetermined trace on the array pattern comprises rotating the electronic map and/or array pattern according to the predetermined trace so that a direction of the predetermined trace matches a direction of the array pattern.

According to a further embodiment of the present disclosure, wherein the generating a predetermined trace on the array pattern so that the external device moves according to the predetermined trace comprises automatically translating an endpoint of the trace which is not in the array pattern to a neighboring array point.

According to an embodiment of the present disclosure, wherein the generating a predetermined trace on the array pattern so that the external device moves according to the predetermined trace comprises calculating coordinates of the predetermined trace based on positions of array points corresponding to the predetermined trace.

According to another embodiment of the present disclosure, wherein the coordinates are relative coordinates or absolute coordinates.

According to a further embodiment of the present disclosure, wherein the calculating coordinates of the predetermined trace based on positions of array points corresponding to the predetermined trace comprises: if coordinates are relative coordinates, calculating a relative coordinate of a starting array point corresponding to the predetermined trace on a basis of a center of the array pattern as a coordinate origin; and the method further comprises controlling the external device to move to the relative coordinate to start to execute the predetermined trace.

According to an embodiment of the present disclosure, wherein the calculating coordinates of the predetermined trace based on positions of array points corresponding to the predetermined trace comprises: if the coordinates are absolute coordinates, calculating an absolute coordinate of the starting array point corresponding to the predetermined trace; and the method further comprises controlling the external device to move to the absolute coordinate to start to execute the predetermined trace.

According to another embodiment of the present disclosure, wherein the starting to execute the predetermined trace comprises: starting to execute the predetermined trace from any point of the predetermined trace.

According to another aspect of the present disclosure, there is disclosed a device for controlling movement of an external device. The device comprises an array generating module configured to generate an array pattern on an interface of a device, and a trace generating module configured to generate a predetermined trace on the array pattern so that the external device moves according to the predetermined trace.

Exemplary embodiments of the present disclosure may bring about at least one of the following technical effects: using the array pattern as a reference point for the trace design, and generating a predetermined trace on the array pattern so that the external device moves according to the predetermined trace, thereby quickly controlling the movement of the external device and improving the transmission efficiency of the control command and a movement efficiency of the smart mobile device.

BRIEF DESCRIPTION OF DRAWINGS

Features, advantages and other aspects of embodiments of the present disclosure will be made more apparent in combination with figures and with reference to the following detailed description. Several embodiments of the present disclosure are illustrated here in an exemplary and unrestrictive manner, which.

DETAILED DESCRIPTION

Exemplary embodiments of the present disclosure will be described in detail with reference to figures. The flowcharts and block diagrams in the figures illustrate system architecture, functions and operations executable by a method and system according to various embodiments of the present disclosure. It should be appreciated that each block in the flowcharts or block diagrams may represent a module, a program segment, or a part of code, which contains one or more executable instructions for performing specified logic functions. It should also be noted that, in some alternative implementations, the functions noted in the block may occur out of the order noted in the figures. For example, two blocks shown consecutively may be performed in parallel substantially or in an inverse order, depending on involved functions. It should also be noted that each block in the block diagrams and/or flow charts and a combination of blocks in block diagrams and/or flow charts may be implemented by a dedicated hardware-based system for executing a prescribed function or operation, or may be implemented by a combination of dedicated hardware and computer instructions.

The terms "comprise", "include" and like terms used in the text should be understood as open-ended terms, i.e., "comprise/include, but not limited to." The term "based on" means "at least partly based on." The term "one embodiment" represents "at least one embodiment"; the terms "another embodiment" and "a further embodiment" represent "at least one additional embodiment." Relevant definitions of other terms will be given in the description below.

It should be appreciated that these exemplary embodiments are presented here to enable those skilled in the art to better understand and thereby implement embodiments of the present disclosure, not to limit the scope of the present disclosure in any manner.

Figure 1:
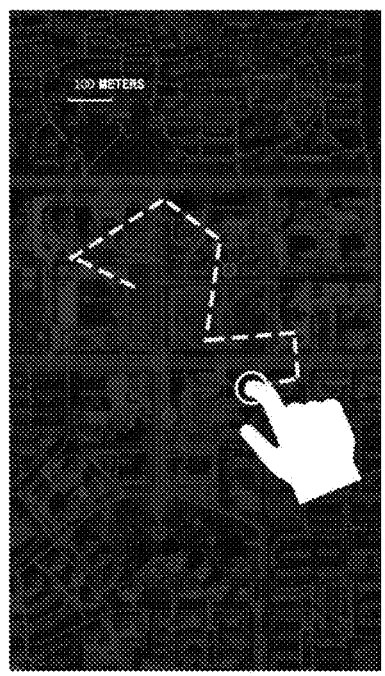
FIG. 1 illustrates an exemplary diagram of generating a movement trace on an electronic map in the prior art.
Figure 2:
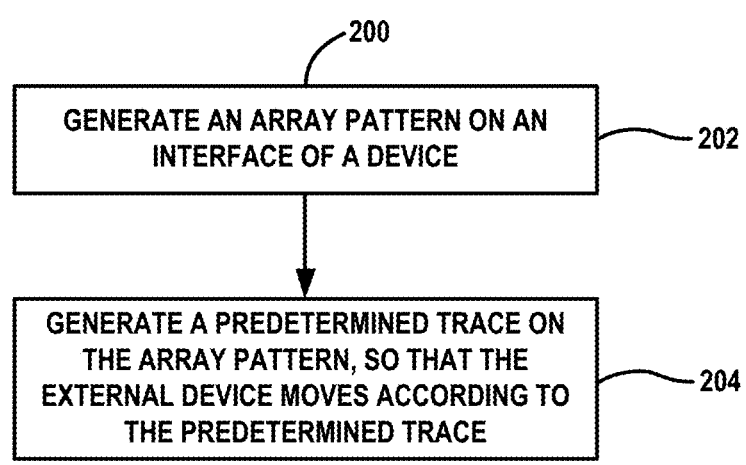
FIG. 2 illustrates a flow chart of a method 200 for controlling a movement of an external device according to embodiments of the present disclosure.
Figure 3:
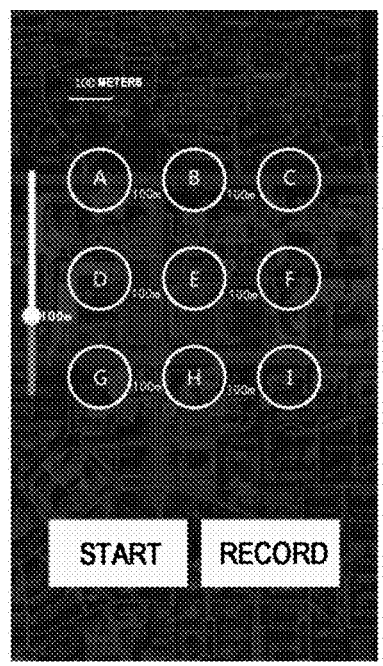
FIG. 3 illustrates an exemplary diagram of an array pattern according to embodiments of the present disclosure.

FIG. 2 illustrates a flow chart of a method 200 for controlling a movement of an external device according to embodiments of the present disclosure. With reference to FIG. 2, at step 202, an array pattern is generated on an interface of a device. The array pattern is a set formed by a group of array points and is used to represent arrangement of array points. For example, in the example as shown in FIG. 3, an array pattern is generated on the interface of the device, the array pattern comprises nine array points, respectively, array point A, array point B, array point C, array point D, array point E, array point F, array point G, array point H and array point I. The array point is overlaid (such as suspended) on an upper layer of a background interface of the device so that the array pattern and the background interface may be displayed simultaneously.

According to an embodiment of the present disclosure, the generated array pattern comprises a rectangular array or an annular array. For example, the generated array pattern may either be a rectangular array, for example, the rectangular array patterns as shown in FIGS. 5A-5E, or an annular array such as a circle array in FIG. 5F which is symmetrical about a center. According to another embodiment of the present disclosure, the rectangular array is an array with three rows and three columns (also referred to as a "nine-grid" array), for example a 3×3 array as shown in FIG. 3 in which nine array points may be distributed evenly. The nine-grid array is a common array pattern in the smart phone. Ordinary users are familiar with such array pattern, and also familiar with generating a pattern in this array pattern. Although the nine-grid array only has nine array points, it can generate up to hundreds of thousands of different traces or patterns, and thus it can satisfy general demands for movement traces.

According to an embodiment of the present disclosure, the generating the array pattern on the interface of the device comprises generating a corresponding array pattern on the interface of the device according to a predetermined setting. Generally, it is possible to generate the array pattern automatically and randomly, or generate a corresponding array pattern according to the user's demands. Before the generation of the array pattern, the user may select a desired array pattern or input corresponding demands. For example, if the user wants to execute a rectangular movement trace, a rectangular array may be generated; and if the user wants to execute a circle movement trace, an annular array may be executed.

According to another embodiment of the present disclosure, after the generation of the array pattern, the user may change the array pattern. For example, if the user is not satisfied with the already-generated array pattern, the device may present all array pattern templates to the user so that the user selects the desired array pattern. According to a further embodiment of the present disclosure, the user may refresh the array pattern to randomly generate a new array pattern.

According to an embodiment of the present disclosure, the generating the array pattern on the interface of the device comprises: generating the array pattern on an electronic map of the device. For example, in the example of FIG. 3, a current background of the device interface is an electronic map, and the array pattern is generated on an upper layer of the electronic map, whereupon the interface of the device now comprises the electronic map in a lower layer, the array pattern in an upper layer and a current map scale (for example, in the example of FIG. 3, an actual distance between neighboring array points maybe 100 meters). By associating the array pattern with the electronic map, the user is enabled to understand an actual position of each array point more visually. According to an embodiment of the present disclosure, the electronic map may be a two-dimensional map, a three-dimensional map, a satellite map and so on.

Continue to refer to FIG. 2, at step 204, a predetermined trace is generated on the array pattern so that the external device moves according to the predetermined trace. With the desired trace being depicted on the array pattern, the external device is controlled to move according to a position corresponding to the trace on the array pattern. Meanwhile, only array points in the array pattern can become endpoints of the trace; thus, fewer endpoints of the trace are generated by use of the array pattern, thereby reducing the number of position points sent to the external device (for example, the smart mobile device).

According to an embodiment of the present disclosure, the generating the predetermined trace on the array pattern comprises moving and/or scaling the electronic map and/or array pattern to generate the predetermined trace on the array pattern. When a default map position does not match a predetermined trace position, the electronic map may be moved to present a user-desired actual map position of the trace in the lower layer of the array pattern. Optionally, the electronic map may be moved by dragging the map directly or translating the map by use of an auxiliary arrow (not shown). For example, if the default position of the electronic map is area A, and the predetermined trace is in area B, and the electronic map may be moved from area A to area B. According to another embodiment of the present disclosure, it is possible to obtain the current position of the external device in real time, and the current position of the external device may be set as a center point of the current electronic map, thereby implementing automatic movement of the electronic map.

According to an embodiment of the present disclosure, when a default map scale does not match a desired trace size, the electronic map and/or array pattern may be scaled so that the default map size matches the desired trace size. For example, if the default map scale is 1:10,000 and the movement trace of the external device might be within a range of tens of thousands of meters, it is necessary to perform scaling processing for the electronic map, for example, scaling the map scale to 1:100.

According to an embodiment of the present disclosure, the moving and/or scaling an electronic map and/or array pattern to generate the predetermined trace on the array pattern comprises moving and/or scaling the electronic map and/or array pattern according to the predetermined trace so that the predetermined trace is completely included in the array pattern.

For example, the electronic map and/or array pattern is moved and/or scaled so that the predetermined trace is suitably included in the array pattern, and thus the array pattern obtains the optimal use efficiency.

According to another embodiment of the present disclosure, in the absence of the background map, the scale of the array pattern may be scaled to satisfy the demands of the predetermined trace. For example, in the absence of the background map, the scale between neighboring array points is enlarged from 1:100 to 1:500, and then an actual position distance between neighboring array points expands by five times.

According to an embodiment of the present disclosure, the generating the predetermined trace on the array pattern comprises: rotating the electronic map and/or array pattern to generate the predetermined trace on the array pattern. When the predetermined trace and the array pattern are offset in angle, rotation operation may be performed. During rotation, either the electronic map or array pattern may be rotated. According to another embodiment of the present disclosure, the rotating the electronic map and/or array pattern to generate the predetermined trace on the array pattern comprises: rotating the electronic map and/or array pattern according to the predetermined trace so that a direction of the predetermined trace matches a direction of the array pattern. For example, in an example of FIGS. 4A-4D, although the array pattern and the predetermined trace are both rectangular, they cannot completely overlap, that is, they are offset in angle. Thus, the electronic map may be rotated so that the array pattern is coincident with the predetermined trace to a maximum degree.

Figure 4A:
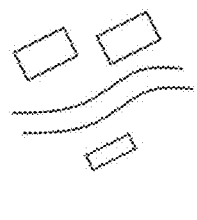
FIGS. 4A-4D illustrate an exemplary diagram of moving, scaling and rotating an electronic map according to embodiments of the present disclosure.
Figure 4B:
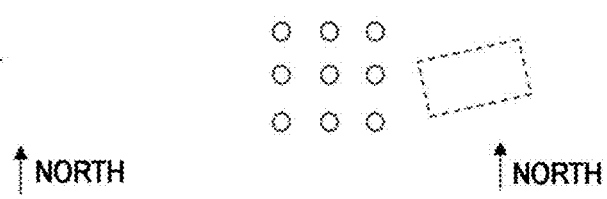
Figure 4C:
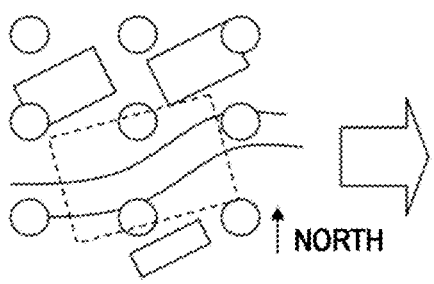
Figure 4D:
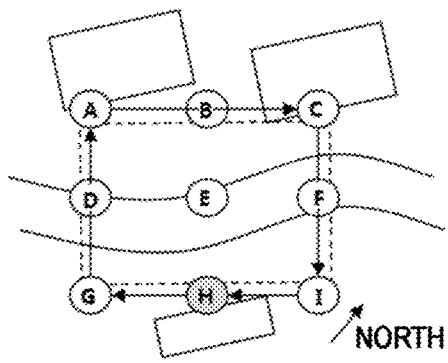

In an example shown in FIGS. 4A through 4D, FIG. 4A represents a current background electronic map, a left side of FIG. 4B is a predetermined array pattern, a right side of FIG. 4B represents the predetermined trace, and FIG. 4C represents generating an interface of the array pattern on the electronic map. In FIG. 4C, the predetermined trace in dotted line does not match the current electronic map and array pattern, so it is necessary to perform processing for the electronic map of FIG. 4C. For example, first, the map is moved up a little so that the center of the predetermined trace is coincident with a central array point of the array pattern, then, the electronic map is scaled so that the predetermined trace is suitably included in the array pattern (that is, coincident to a maximum degree), and then, the map is selected clockwise so that the rectangular predetermined trace matches the rectangular array pattern in direction, thereby obtaining the interface as shown in FIG. 4D. According to another embodiment of the present disclosure, it is possible to perform rotation operation first and then perform the moving and/or scaling operation(s). According to a further embodiment of the present disclosure, it is also possible to keep the electronic map stationary, and the array pattern is enabled to be coincident with and/or match the predetermined trace by moving and/or scaling the array pattern.

After the interface of FIG. 4D is generated, a corresponding trace is generated on the array pattern according to the predetermined trace. For example, a finger crosses array point H, array point G, array point A, array point C, array point I and array point H in FIG. 4D in turn, thereby generating the trace in a direction as indicated by the arrow in FIG. 4D. It is seen that the rectangular array only involves five endpoints, that is, array point H, array point G, array point A, array point C, and array point I.

According to an embodiment of the present disclosure, the generating the predetermined trace on the array pattern so that the external device moves according to the predetermined trace comprises: automatically translating an endpoint(s) of the trace which is not in the array pattern to a neighboring array point(s). When the predetermined trace is generated, due to an input error (such as an error of a finger touch), some input points are at a certain distance from actual array points. Upon generation of the trace, unnecessary input errors may be reduced by automatically translating the endpoint not in the array pattern to the neighboring array point.

Figure 5A:
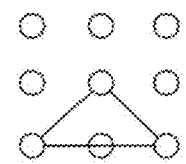
FIGS. 5A-5F illustrate an exemplary diagram of generating a predetermined trace according to embodiments of the present disclosure.
Figure 5B:
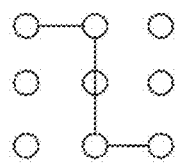
Figure 5C:
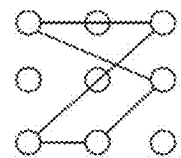
Figure 5D:
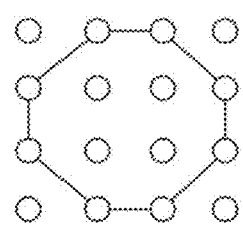
Figure 5E:
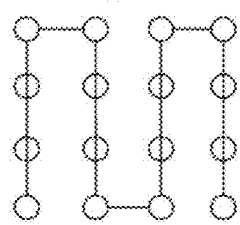
Figure 5F:
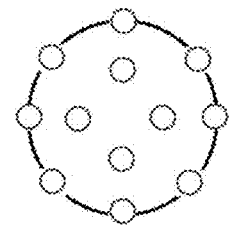

According to an embodiment of the present disclosure, the generated trace may be drawn by the user arbitrarily. In addition to the commonly-used rectangular trace, the trace may further comprise but not limited to a triangular trace as shown in FIG. 5A, a "Z"-shaped trace as shown in FIG. 5B, an interlaced trace as shown in FIG. 5C, an octagonal trace as shown in FIG. 5D, an "M"-shaped trace as shown in FIG. 5E and an annular trace as shown in FIG. 5F. In the traces in FIGS. 5A-5D, since the distance between array points is already known and equal, it is easy to determine the movement mode to which the trace belongs.

According to an embodiment of the present disclosure, the generating the predetermined trace on the array pattern so that the external device moves according to the predetermined trace comprises: calculating coordinates of the predetermined trace based on positions of the array points corresponding to the predetermined trace. For example, it is feasible to, by determining map position points of each point in the predetermined trace, obtain a coordinate position of each array point in the trace and further obtain the coordinate position of the predetermined trace. For example, in the embodiment of FIGS. 4A-4D, calculations are performed respectively for coordinates of map position points corresponding to array point H, array point G, array point A, array point C and array point I, and the calculated position coordinates are sent to the external device, for example, coordinate corresponding the point H, coordinate corresponding to point G, coordinate corresponding to point A, coordinate corresponding to point C and coordinate corresponding to point I. After receiving the above coordinate command, the external device sequentially moves to the coordinate corresponding the point H, coordinate corresponding to point G, coordinate corresponding to point A, coordinate corresponding to point C, coordinate corresponding to point I and coordinates corresponding to point H in turn.

According to an embodiment of the present disclosure, upon completion of the drawing of the predetermined trace, as shown in FIG. 3, a "start" button on the interface may be triggered to control the external device to start to move. According to another embodiment of the present disclosure, the external device is controlled immediately to start to move once completion of the trace (for example, the finger leaves the array pattern).

According to an embodiment of the present disclosure, the calculated coordinates are relative coordinates or absolute coordinates. According to an embodiment of the present disclosure, the calculating coordinates of the predetermined trace based on positions corresponding to the array points of the predetermined trace comprises: if the coordinates are relative coordinates, calculating a relative coordinate corresponding to a starting array point of the predetermined trace on a basis of a center of the array pattern as a coordinate origin; and the method further comprises controlling the external device to move to the relative coordinate to start to execute the predetermined trace. For example, in an example of FIG. 3, a point H-point G-point A-point C-point I-point H trace is generated. When the distance between neighboring array points is 100 meters and an upward direction is north, point E may be selected as the origin of the array pattern, and the relative coordinate of the starting point H may be calculated. The external device first moves to the south 100 meters (that is, move from the origin E to the starting point H of the array pattern), and then starts to execute the predetermined trace. That is, it first moves to the west 100 meters, then moves to the north 200 meters, then moves to the east 200 meters, then moves to the south 200 meters and finally again moves to the west 100 meters, thereby returning to the original position of the external device.

According to another embodiment of the present disclosure, the calculating coordinates of the predetermined trace based on positions corresponding to the array points of the predetermined trace comprise: if the coordinates are absolute coordinates, calculating an absolute coordinate corresponding to a starting array point of the predetermined trace; and the method further comprises controlling the external device to move to the absolute coordinates to start to execute the predetermined trace. For example, in the example as shown in FIG. 4D, the point H-point G-point A-point C-point I-point H trace is generated, and the device calculates absolute coordinate positions corresponding to the predetermined trace (for example, point H, point G, point A, point C, and point I). After the external device receives the coordinate positions of the predetermined trace, the well-known technology in the art is first used to enable the external device to move to the absolution coordinate position corresponding to the starting point H, and then the external device starts to execute the predetermined trace. In other words, the external device moves in turn to the absolute coordinate position corresponding to point G, the absolute coordinate position corresponding to point A, the absolute coordinate position corresponding to point C, the absolute coordinate position corresponding to point I, and absolute coordinate position corresponding to point H.

According to a further embodiment of the present disclosure, the starting to execute the predetermined trace comprises: starting to execute the predetermined trace from any point of the predetermined trace. For example, in the point H-point G-joint A-point C-point I-point H trace in the example of FIG. 4D, the device may be controlled to start to execute from any point of the trace, for example, it may start to execute the predetermined trace from point C, and then the actual trace of the external device is point C-point I-point H.

Figure 6:
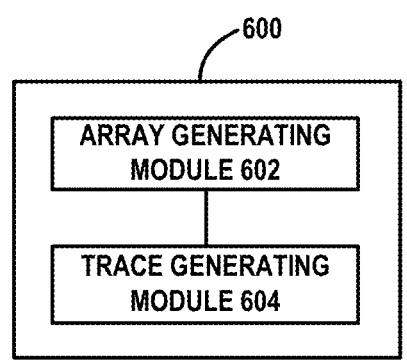
FIG. 6 illustrates a block diagram of a device 600 for controlling a movement of an external device according to embodiments of the present disclosure.

FIG. 6 illustrates a block diagram of a device 600 for controlling a movement of an external device according to an embodiment of the present disclosure. The device comprises an array generating module 602 configured to generate an array pattern on an interface of a device and a trace generating module 604 configured to generate a predetermined trace on the array pattern so that the external device moves according to the predetermined trace.

According to an embodiment of the present disclosure, the generated array pattern comprises any of a rectangular array and an annular array. According to another embodiment of the present disclosure, the rectangular array is an array with three rows and three columns.

According to an embodiment of the present disclosure, the array generating module is further configured to generate a corresponding array pattern on the interface of the device according to a predetermined setting.

According to an embodiment of the present disclosure, the array generating module is further configured to: generate the array pattern on an electronic map of the device. According to another embodiment of the present disclosure, the array generating module further comprises a moving module and/or scaling module configured to move and/or scale the electronic map and/or array pattern to generate the predetermined trace on the array pattern. According to a further embodiment of the present disclosure, the moving module and/or scaling module is further configured to move and/or scale the electronic map and/or array pattern according to the predetermined trace so that the predetermined trace is completely included in the array pattern.

According to an embodiment of the present disclosure, the array generating module further comprises a rotating module configured to rotate the electronic map and/or array pattern to generate the predetermined trace on the array pattern. According to another embodiment of the present disclosure, the rotating module is further configured to rotate the electronic map and/or array pattern according to the predetermined trace so that a direction of the predetermined trace matches a direction of the array pattern.

According to a further embodiment of the present disclosure, the trace generating module further comprises a translating module configured to automatically translate an endpoint of the trace which is not in the array pattern to a neighboring array point.

According to a further embodiment of the present disclosure, the trace generating module further comprises a calculating module configured to calculate coordinates of the predetermined trace based on positions corresponding to the array points of the predetermined trace.

According to another embodiment of the present disclosure, the calculating module is further configured to, if the coordinates are relative coordinates, calculate a relative coordinate corresponding to a starting array point of the predetermined trace on a basis a center of the array pattern as a coordinate origin; and the trace generating module is further configured to control the external device to move to the relative coordinate to start to execute the predetermined trace. According to another embodiment of the present disclosure, the calculating module is further configured to, if the coordinates are absolute coordinates, calculate an absolute coordinate corresponding to the starting array point of the predetermined trace; and the trace generating module is further configured to control the external device to move to the absolute coordinate to start to execute the predetermined trace. According to a further embodiment of the present disclosure, the starting to execute the predetermined trace comprises: starting to execute the predetermined trace from any point of the predetermined trace.

It should be appreciated that the device 600 may be implemented in various manners. For example, in some embodiments, the device 600 may be implemented in software, hardware, or the combination thereof. The hardware part can be implemented by a special logic; the software part can be stored in a memory and executed by a proper instruction execution system such as a microprocessor or a design-specific hardware. Those skilled in the art may understand that the above method and device may be implemented with a computer-executable instruction and/or in a processor controlled code, for example, such code is provided on a bearer medium such as a magnetic disk, CD, or DVD-ROM, or a programmable memory such as a read-only memory or a data bearer such as an optical or electronic signal bearer. The device and their module in embodiments of the present disclosure may be implemented by hardware circuitry of a programmable hardware device, such as a very large scale integrated circuit or gate array, a semiconductor such as logical chip or transistor, or a field-programmable gate array, or a programmable logical device, or may be implemented by software executed by various kinds of processors, or implemented by combination of the above hardware circuitry and software.

It should be noted that although a plurality of modules, means or sub-module, sub-means of the device have been described in the above detailed description, such partitioning is merely exemplary and non-compulsory. Actually, according to embodiments of the present disclosure, the features and functions of the above described two or more modules may be embodied in one module. On the contrary, the features and functions of the above described in one module may be further embodied in two or more modules.

What are described above are only optional embodiments of the present disclosure and not intended to limit embodiments of the present disclosure. Embodiments of the present disclosure may have various modifications and variations. Any modifications, equivalent substitutions and improvements made within the spirit and principle of embodiments of the present disclosure all should be included in the protection scope of embodiments of the present disclosure.

Although the embodiments of the present disclosure have been depicted with reference to a plurality of embodiments, it should be understood that the embodiments of the present disclosure are not limited to the disclosed embodiments. The embodiments of the present disclosure intend to cover various modifications and equivalent arrangements included in the spirit and scope of the appended claims. The scopes of the appended claims conform to the broadest explanations and cover all such modifications and equivalent structures and functions.

What is claimed is:

1. A method for controlling a movement of an external device, comprising:
   generating an array pattern on an interface of a device, the array pattern generated on an electronic map of the device;
   generating a predetermined trace on the array pattern so that the external device moves according to the predetermined trace; and
   controlling the external device to move according to the predetermined trace.

2. The method according to claim 1, wherein the generated array pattern comprises any of the following: a rectangular array and an annular array.

3. The method according to claim 2, wherein the rectangular array is an array with three rows and three columns.

4. The method according to claim 1, wherein the generating an array pattern on an interface of a device comprises:
   generating a corresponding array pattern on the interface of the device according to a predetermined setting.

5. The method according to claim 1, wherein the generating a predetermined trace on the array pattern comprises:
   moving and/or scaling the electronic map and/or the array pattern to generate the predetermined trace on the array pattern.

6. The method according to claim 5, wherein the moving and/or scaling the electronic map and/or the array pattern to generate the predetermined trace on the array pattern comprises:

moving and/or scaling the electronic map and/or the array pattern according to the predetermined trace so that the predetermined trace is completely included in the array pattern.

7. The method according to claim 1, wherein the generating a predetermined trace on the array pattern comprises:

rotating the electronic map and/or the array pattern to generate the predetermined trace on the array pattern.

8. The method according to claim 7, wherein the rotating the electronic map and/or the array pattern to generate the predetermined trace on the array pattern comprises:

rotating the electronic map and/or the array pattern according to the predetermined trace so that a direction of the predetermined trace matches a direction of the array pattern.

9. The method according to claim 1, wherein the generating a predetermined trace on the array pattern so that the external device moves according to the predetermined trace comprises:

automatically translating an endpoint of the trace which is not in the array pattern to a neighboring array point.

10. The method according to claim 1, wherein the generating a predetermined trace on the array pattern so that the external device moves according to the predetermined trace comprises:

calculating coordinates of the predetermined trace based on positions of array points associated with the predetermined trace.

11. The method according to claim 10, wherein the coordinates are relative coordinates or absolute coordinates.

12. The method according to claim 11, wherein the calculating coordinates of the predetermined trace based on positions of array points associated with the predetermined trace comprises:

in response to the coordinates being the relative coordinates, calculating a relative coordinate of a starting array point associated with the predetermined trace on a basis of a center of the array pattern as a coordinate origin;

and wherein controlling the external device to move according to the predetermined trace comprises:

controlling the external device to move to the relative coordinate to start to execute the predetermined trace.

13. The method according to claim 12, wherein the starting to execute the predetermined trace comprises:

starting to execute the predetermined trace from any point of the predetermined trace.

14. The method according to claim 11, wherein the calculating coordinates of the predetermined trace based on positions of array points associated with the predetermined trace comprises:

in response to the coordinates being the absolute coordinates, calculating an absolute coordinate of a starting array point associated with the predetermined trace;

and wherein controlling the external device to move according to the predetermined trace comprises:

controlling the external device to move to the absolute coordinate to start to execute the predetermined trace.

15. A device for controlling a movement of an external device, comprising:

a controller;

a memory in communication with the controller, the memory storing executable instructions executable by the controller to:

generate an array pattern on an interface of the device, wherein the array pattern is generated on an electronic map of the device;

generate a predetermined trace on the array pattern so that the external device moves according to the predetermined trace; and control the external device to move according to the predetermined trace.

16. The device according to claim 15, wherein the generated array pattern comprises any of the following: a rectangular array and an annular array.

17. The device according to claim 16, wherein the rectangular array is an array with three rows and three columns.

18. The device according to claim 15, wherein the executable instructions are further executable by the controller to:

generate a corresponding array pattern on the interface of the device according to a predetermined setting.

* * * * *